June 30, 1970    A. BOUCHAT    3,517,527

REVERSIBLE AIR CONDITIONING UNIT

Filed Aug. 2, 1968

INVENTOR
A. *BOUCHAT*
BY
*Raymond A. Robie*
ATTORNEY 3,517,527
REVERSIBLE AIR CONDITIONING UNIT
André Bouchat, Brussels, Belgium, assignor to Ateliers de Constructions Electriques de Charleroi (ACEC), Charleroi, Belgium
Filed Aug. 2, 1968, Ser. No. 749,860
Claims priority, application Belgium, Aug. 4, 1967, 47,053
Int. Cl. F25b 29/00
U.S. Cl. 62—325                    6 Claims

ABSTRACT OF THE DISCLOSURE

This enclosure concerns a reversible air conditioning unit which may be changed over from summer to winter operation. Such unit comprises at least one fan mounted on a throttle having an aperture therein for the passage of intake air from one side of the throttle towards the other side thereof. The throttle may be pivoted in a duct so as to force air, in one position towards one end of the duct and, in the other position, towards the other end of the duct.

---

This invention relates to an air conditioning unit which may be changed over from a winter to a summer operation. Some arrangements are known among others in which, during winter, the fresh air flows through the condenser of a heat pump and in which, during summer, the fresh air flows through the evaporator of the same heat pump. In each of the above operations, the foul air flows through the other part of the heat pump.

The object of the invention is a reversible air conditioning unit which is particularly compact and simple. Such unit comprises at least one fan mounted on a throttle having an aperture therein for the passage of intake air from one side of the throttle towards the other side thereof, the throttle being placed in a duct in such a way that it may be pivoted and so force air, in one position, towards one end of the duct and, in the other position, towards the other end of the duct.

The invention will now be described with reference to an embodiment thereof illustrated in the drawings, in which.

Figures 1, 2:
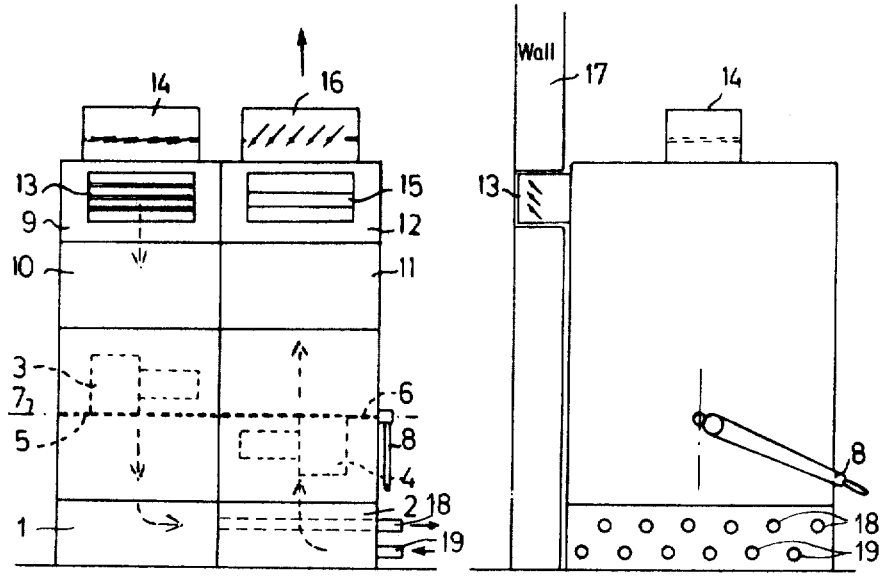
FIG. 1 illustrates an elevation view, partially in cross-section, of a reversible air conditioning unit arranged for winter operation.
FIG. 2 illustrates a side view of the air conditioning unit of FIG. 1.
Figures 3, 4:
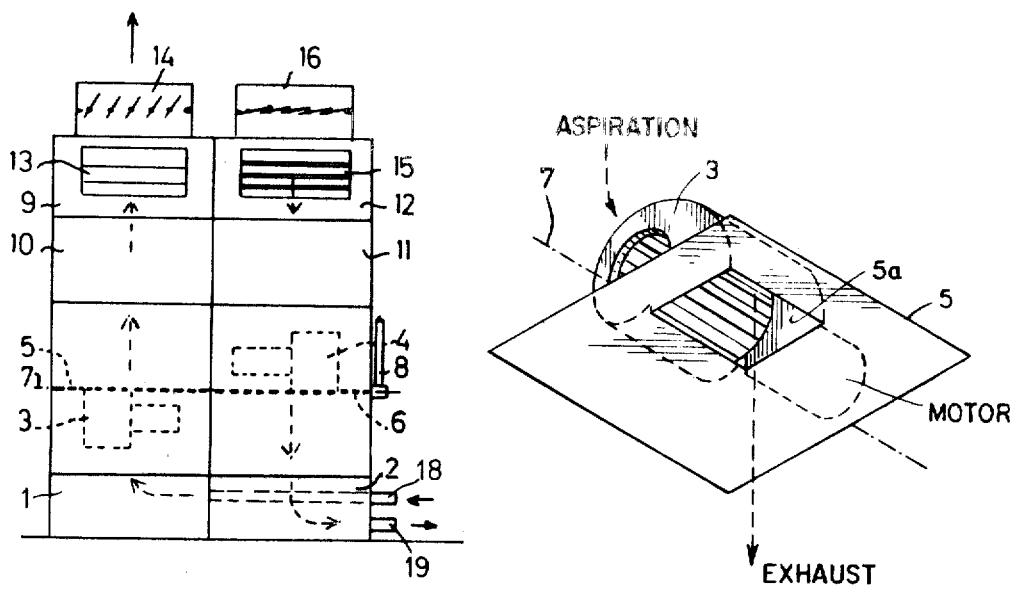
FIG. 3 illustrates the air conditioning unit of FIG. 1 arranged for summer operation.
FIG. 4 illustrates a perspective bottom view of a fan mounted on a throttle.

In the drawings, the reversible air conditioning unit is positioned on a base in which there is provided a first air box 1 communicating with ducts 18 leading to air vents positioned near or in the ceiling of the various rooms of a building and a second air box 2 into which leads ducts 19 connected to air vents positioned near the floor of the rooms. The reversible air conditioning unit comprises a fan group consisting of two fans 3 and 4, each mounted on mobile throttles 5 and 6 having apertures therein (5a in FIG. 4) for the passage of the intake air from on one side of the throttles towards the other side thereof. The two throttles are secured on the same axis 7 and may be operated by a lever 8. In position "winter" (FIG. 1), fan 3 sucks the air from distribution box 9 by creating a vacuum therein, and conveys it through condenser 10 of a heat pump and forces it into air box 1. Fan 4 sucks the air from air box 2 and forces it through evaporator 11 of the heat pump into distribution box 12 where a pressure is created. Distribution boxes 9 and 12 each have two orifices 13, 14 and 15, 16 respectively. Each of these orifices are closed by mobile shutters which open or close tightly depending on the pressure conditions inside distribution boxes 9 and 12. Orifice 13, which opens only when there is a vacuum inside distribution box 9, and orifice 15 which closes when there is a pressure inside distribution box 12, are connected to a fresh air inlet through a wall of the building (FIG. 2). Orifice 14 which closes when there is a vacuum inside distribution box 9 and orifice 16 which opens when there is a pressure inside distribution box 12, are connected to a foul air exhaust which is constituted by a chimney connected to the room in which is located the air conditioning unit.

During summer and winter operations, air is always sucked in by the fresh air inlet and forced out through the foul air exhaust. Consequently, it is possible to connect all the air conditioning units of a large area, such as for example a building, to the same fresh air inlet and to the same foul air exhaust. However, inside each air conditioning unit the air flow is reversed during summer operation with respect to winter operation. This reversal is obtained simply by rotating lever 8, which rotates by 180° throttles 5 and 6 upon which are mounted fans 3 and 4.

I claim:
1. A reversible unit for an air conditioning installation comprising:
   (a) at least one throttle located in a duct, said throttle having an aperture therein;
   (b) a fan mounted on the throttle for the delivery of air drawn from one side of the throttle through said aperture towards the other side of the throttle; and
   (c) means for pivoting said throttle in said air duct around an axis of rotation so as to force air in one position towards one end of the duct and in the other position towards the other end of the duct.

2. A reversible unit as defined in claim 1, comprising two fans each mounted on a separate throttle in different ducts, said throttles being secured to said axis and pivoted together.

3. A reversible unit as claimed in claim 2, wherein one of the ducts includes a first distribution box and a condenser of a heat pump and wherein one of the fans sucks in or forces out air, and wherein the other duct includes a second distribution box and an evaporator of a heat pump and wherein the other fan sucks in or forces out air.

4. A reversible unit as defined in claim 2, comprising first ducts leading to air vents located near or in the ceiling of various rooms of a building connected to one of the fans, and second ducts leading to air vents located near the floor of the rooms connected to the other fan.

5. A reversible unit as defined in claim 3, wherein each distribution box comprises two orifices closed by shutters, one orifice being open and the other hermetically closed when there is vacuum inside the distribution box, the above conditions being reversed when there is a pressure inside the distribution box.

6. A reversible unit as defined in claim 5, comprising a fresh air inlet connected to the orifices which are opened when there is vacuum in the respective distribution box and comprising a foul air outlet connected to the orifices which are opened when there is pressure inside the respective distribution box.

References Cited

UNITED STATES PATENTS

| | | | |
|---|---|---|---|
| 2,216,427 | 10/1940 | Arnold | 62—325 |
| 2,718,119 | 9/1955 | Prince | 62—325 |
| 2,466,383 | 4/1949 | Cody | 62—325 |
| 2,817,958 | 12/1957 | Beckett | 62—325 |
| 2,984,087 | 5/1961 | Folsom | 62—325 |
| 3,084,522 | 4/1963 | Hames | 62—325 |
| 3,143,864 | 8/1964 | Schordine | 62—325 |
| 3,220,212 | 11/1965 | Fordsmond | 62—325 |

FOREIGN PATENTS 1,123,483  6/1956  France.

WILLIAM J. WYE, Primary Examiner

U.S. Cl. X.R.

62—408